(12) United States Patent
Maeda

(10) Patent No.: US 7,298,517 B2
(45) Date of Patent: *Nov. 20, 2007

(54) IMAGE PROCESSING APPARATUS

(75) Inventor: Harunobu Maeda, Numazu (JP)

(73) Assignees: Toshiba Tec Kabushiki Kaisha, Tokyo (JP); Kabushiki Kaisha Toshiba, Tokyo (JP)

( * ) Notice: Subject to any disclaimer, the term of this patent is extended or adjusted under 35 U.S.C. 154(b) by 181 days.

This patent is subject to a terminal disclaimer.

(21) Appl. No.: 11/186,546

(22) Filed: Jul. 21, 2005

(65) Prior Publication Data

US 2005/0254830 A1 Nov. 17, 2005

Related U.S. Application Data

(63) Continuation of application No. 09/789,244, filed on Feb. 20, 2001, now Pat. No. 7,027,173.

(30) Foreign Application Priority Data

Feb. 21, 2000 (JP) .............................. 2000-043119

(51) Int. Cl.
*G06K 9/00* (2006.01)
*H04N 1/00* (2006.01)
*G03G 15/00* (2006.01)

(52) U.S. Cl. .................... 358/1.15; 358/406; 358/434; 358/468; 382/112; 399/10; 399/11; 399/24; 399/27

(58) Field of Classification Search ............... 358/1.15, 358/404, 406, 434, 468, 438–439, 442, 444; 382/112; 700/79–82; 399/8–9, 15, 18–20, 399/10, 11, 24, 27; 714/25, 30
See application file for complete search history.

(56) References Cited

U.S. PATENT DOCUMENTS 6,459,504 B1 * 10/2002 Murano et al. ............. 358/406
6,665,425 B1 * 12/2003 Sampath et al. ............ 382/112

FOREIGN PATENT DOCUMENTS

JP 8-167960 A 6/1996

\* cited by examiner

*Primary Examiner*—Kimberly Williams
*Assistant Examiner*—Charlotte M. Baker
(74) *Attorney, Agent, or Firm*—Frishauf, Holtz, Goodman & Chick, P.C.

(57) ABSTRACT

A facsimile device includes a printing unit for printing an image by using an expendable component, and a communication circuit connectable to a supplier of the expendable component via a communication network. Particularly, the facsimile device further includes an order controller for confirming that maintenance of the expendable component is required a number of times corresponding to an order-unit quantity, and for controlling the communication circuit such that order information for ordering the expendable component of the order-unit quantity is transmitted to the supplier.

10 Claims, 5 Drawing Sheets

ORDER FORM OF EXPENDABLES

CUSTOMER ID NUMBER:ZZZ12345
NAME OF PERSON IN CHARGE:TARO YAMADA
CONTACT TELEPHONE NUMBER:03-1234-5678
CONTACT FAX NUMBER:03-1234-5679

PLEASE DELIVER TONER PACKS BECAUSE THE STOCK WILL BE RUN OUT.

COMPONENT NUMBER:ABC9999
ORDER-UNIT QUANTITY:60

FIG. 4

ORDER FORM OF EXPENDABLES

CUSTOMER ID NUMBER:ZZZ12345
NAME OF PERSON IN CHARGE:TARO YAMADA
CONTACT TELEPHONE NUMBER:03-1234-5678
CONTACT FAX NUMBER:03-1234-5679

PLEASE DELIVER TONER PACKS BECAUSE THE STOCK WILL BE RUN OUT.

COMPONENT NUMBER:ABC9999
ORDER-UNIT QUANTITY:60

41

TRANSMISSION OF THIS ORDER IS SUCCESSFUL

FIG. 5

ORDER FORM OF EXPENDABLES

CUSTOMER ID NUMBER:ZZZ12345
NAME OF PERSON IN CHARGE:TARO YAMADA
CONTACT TELEPHONE NUMBER:03-1234-5678
CONTACT FAX NUMBER:03-1234-5679

PLEASE DELIVER TONER PACKS BECAUSE THE STOCK WILL BE RUN OUT.

COMPONENT NUMBER:ABC9999
ORDER-UNIT QUANTITY:60

51

TRANSMISSION OF THIS ORDER IS FAILED

FIG. 6

IMAGE PROCESSING APPARATUS

CROSS-REFERENCE TO RELATED APPLICATIONS

The present application is a continuation application of U.S. application Ser. No. 09/789,244, now U.S. Pat. No. 7,027,173, filed Feb. 20, 2001, which is based upon and claims the benefit of priority from the prior Japanese Patent Application No. 2000-043119, filed Feb. 21, 2000, the entire contents of which are incorporated herein by reference.

BACKGROUND OF THE INVENTION

The present invention generally relates to an image processing apparatus such as a facsimile device or the like, and more particularly to an image processing apparatus that uses expendables to print an image.

A recent facsimile device employs a printing unit of an electrophotographic type. This printing unit performs printing by forming an electrostatic latent image on a photosensitive drum, developing the latent image into a toner image with toner deposited on the photosensitive drum and selectively adhered to the latent image, and transferring the toner image to plain paper. The toner and the photosensitive drum are expendables that are decreased or deteriorated by repetitive printing. Consequently, the facsimile device monitors the consumed amount of toner and the number of times the photosensitive drum is used for printing, and issues a request for maintenance such as supplement of the toner or replacement of the photosensitive drum to the user by a display or the like when it is determined that the remaining amount of toner is low or the remaining service life of the drum is short.

Generally, a request to the user is issued early enough to allow a time margin for procurement of the expendables, i.e., toner and photosensitive drum. Even after issuance of the request, the printing unit is able to continue normal printing for a while. If the toner is supplemented before the complete depletion thereof and the photosensitive drum is replaced before the complete wear-out thereof, the situation can be avoided in which the printing unit is unusable due to the matter of the expendables.

Incidentally, the expendables must be obtained by a request to a supplier such as a sales dealer, or a visit to the supplier. In some cases, the expendables are sold out and not available within the time margin for procurement. In preparation for such cases, a number of such expendables are purchased at one time and stocked close at hand so that they can be ready for use. However, it is time-consuming to carry out continuous stock management for preventing the expendables from being out of stock.

BRIEF SUMMARY OF THE INVENTION

In view of the above circumstances, an object of the present invention is to provide an image processing apparatus which can prevent expendables from being out of stock, without requiring any stock management on the side of the user.

According to the present invention, there is provided an image processing apparatus which comprises: a printing unit for printing an image by using an expendable component; a communication circuit connectable to a supplier of the expendable component via a communication network; and an order controller for confirming that maintenance of the expendable component is required a number of times corresponding to an order-unit quantity, and for controlling the communication circuit such that order information for ordering the expendable component of the order-unit quantity is transmitted to the supplier.

In this image processing apparatus, the order controller controls the communication circuit such that order information for ordering the expendable component of the order-unit quantity is transmitted to the supplier. In a case where the initial stock of the expendable component exceeds the order-unit quantity, a constant amount of stock of the expendable component is maintained each time the order information is transmitted. Consequently, even when a time delay occurs in procurement of the expendable component, the image processing apparatus is not unusable due to lack of stock. Furthermore, this image processing apparatus does not require stock management for preventing the expendable component from being out of stock, therefore reducing the burden on the user.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a view showing one example of an order form transmitted in the order process shown in FIG. 3;

FIG. 5 is a view showing one example of an order transmission report of success printed in the order process shown in FIG. 3; and FIG. 6 is a view showing one example of an order transmission report of failure printed in the order process shown in FIG. 3.

DETAILED DESCRIPTION OF THE INVENTION

A facsimile device according to one embodiment of the present invention will be explained with reference to the accompanying drawings. This facsimile device is an electrophotographic type image processing apparatus which performs printing on plain paper according to image data.

Figure 1:
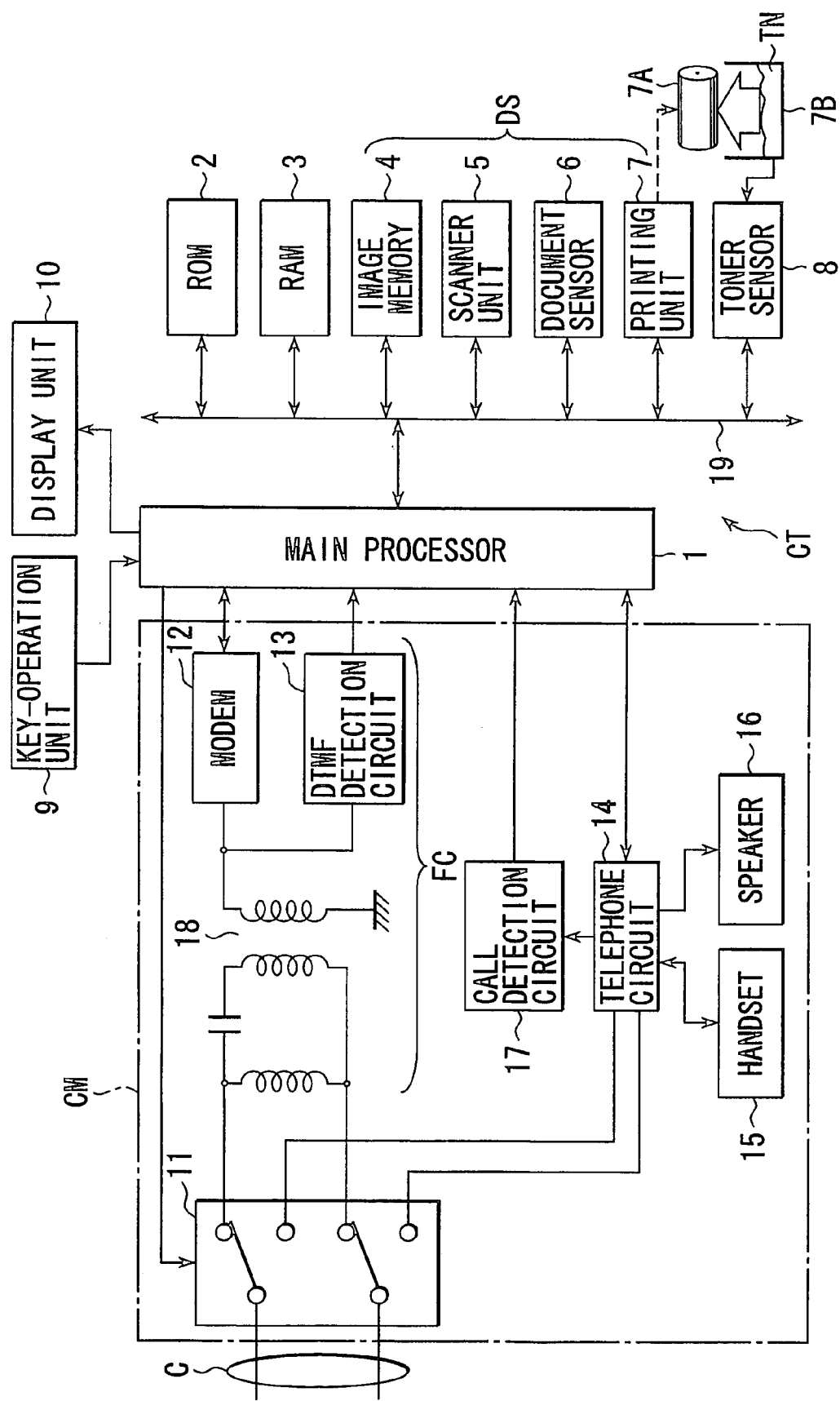
FIG. 1 is a view showing a circuit structure of a facsimile device according to one embodiment of the present invention.

FIG. 1 shows a circuit structure of the facsimile device. The facsimile device comprises a control section CT, an image input and output section DS, and a communication circuit CM. The control section CT includes a main processor 1 for controlling an overall operation of the facsimile device, a ROM 2 storing a control program and fixed data of the main processor 1, and a RAM 3 for temporarily storing data input to and output from the main processor 1. The image input and output section DS includes an image memory 4 for temporarily storing transmission image data, reception image data, and other image data, a scanner unit 5 for reading an image of an original document, and a document sensor 6 for detecting that the original document is placed on the scanner unit 5, and a printing unit 7 for printing an image corresponding to image data stored in the image memory 4. The image is printed by an electrophotographic printing process of forming an electrostatic latent image on a photo-sensitive drum 7A with a laser beam applied according to the image data, developing the electrostatic latent image into a toner image with toner TN deposited from a toner pack 7B onto the photosensitive drum 7A and selectively adhered to the electrostatic latent image as a developing agent, and transferring the toner image onto plain paper. The photosensitive drum 7A and the toner pack 7B are expendable components that are deteriorated or decreased by repetitive printing.

In association with the image input and output section DS, the control section CT further includes a toner sensor 8 for detecting that the toner pack 7B used for development is in a state of near empty or depletion, a key-operation unit 9 for inputting various commands and data from the user, and a display unit 10 for displaying various information which should be notified to the user. The main processor 1 is connected to the ROM 2, the RAM 3, the image memory 4, the scanner unit 5, the document sensor 6, the printing unit 7, and the toner sensor 8 with a system bus 19 and performs a control process on the basis of the control program stored in the ROM 2. This control process includes a transmission and reception process of image data, a copying process of original documents, a printing process of the transmitted and received journals, an initializing process of all the components, a maintenance process of the expendable components, and an order process of the expendable components. The maintenance process is performed each time the printing unit 7 operates in the above processes, and the order process is performed each time execution of the maintenance is confirmed. The key-operation unit 9 has a plurality of key switches for inputting a mode setting command, a start transmitting command, a FAX number of the communication partner such as a supplier of expendables or the like. The display unit 10 is composed of, for example, a liquid crystal display panel or the like to display various information such as status information, a maintenance request, a command input request, a data input request or the like.

A communication circuit CM includes a circuit selection switch 11 for performing a circuit selection with respect to a communication network C such as a PSTN (Public Switched Telephone Network), a modem 12 for transmitting and receiving image data, a DTMF detection circuit 13 for demodulating a DTMF (Dual Tone Multi Frequency) signal, a telephone circuit 14 for transmitting and receiving audio information, a handset 15 for voice communication, a speaker 16 for notifying a dial call, a call detection circuit 17 for detecting a dial-call signal, and a matching circuit 18 for matching with the communication network C. The modem 12, the DTMF detection circuit 13, and the matching circuit 18 constitute a facsimile circuit FC for performing image communication under a facsimile communication protocol. The modem 12 and the DTMF detection circuit 13 are connected to the circuit selection switch 11 via the matching circuit 18. The circuit selection switch 11 is, for example, a relay controlled by the main processor 1 such that a selected one of the facsimile circuit FC and the telephone circuit 14 is connected to the communication network C. In an automatic communication mode, the communication network C is connected to the facsimile circuit FC in advance. In a manual communication mode, the telephone circuit 14 is connected to the telephone circuit 14C in advance, and this connection is switched into the facsimile circuit FC from the telephone circuit 14C according to an operation of the key-operation unit 9 made by the operator. The matching circuit 18 comprises a coil, a capacitor, and a transformer, for example.

A transmission and reception process of the image data will be explained below. When the automatic communication mode is set by means of a mode setting command input from the key-operation unit 9, the circuit selection switch 11 is controlled by the main processor 1 to connect the facsimile circuit FC to the communication network C. In this state, the start transmitting command is input from the key-operation unit 9, along with the FAX number data of the communication partner. The main processor 1 checks the document sensor 6 in response to the start transmitting command, so as to drive the scanner unit 5 when it is confirmed that the original document is placed on the scanner unit 5. This scanner unit 5 reads an image of the original document as the transmission image data of a digital form and stores the transmission image data in the image memory 4. The main processor 1 performs a redundant compression coding on the transmission image data stored in the image memory 4. Further, the main processor 1 causes the transmission image data to be subjected to a tone and shading correction in the RAM 3. Subsequently, the main processor 1 controls the modem 12 for transmission of the image data. With this control, the modem 12 generates a dial-call signal corresponding to the FAX number data of the communication partner and a control signal of inquiring an available transmission format. The dial-call signal and the control signal are generated in a DTMF form from the modem 12, and output to the communication network C via the matching circuit 18 and the circuit selection switch 11. When the communication partner responds to the dial-call signal and transmits a control signal of the DTMF form as a response to the inquiry, the DTMF detection circuit 13 demodulates this control signal, so that the main processor 1 can be informed of the available transmission format. When the main processor 1 designates the transmission format to the modem 12, the modem 12 demands the main processor 1 to supply the transmission image data stored in the RAM 3. Upon supply of the image data, the modem 12 converts the transmission image data into a facsimile signal of the designated transmission format. This facsimile signal is output to the communication network C via the matching circuit 18 and the circuit selection switch 11.

On the other hand, when dial-call and control signals of the DTMF form arrive from the communication network C in a state that the facsimile circuit FC is connected to the communication network C, the DTMF detection circuit 13 demodulates the dial-call and control signals and confirms the FAX number represented by the dial-call signal and the inquiry of the available transmission format represented by the control signal, so that the main processor 1 can be informed of the available transmission format. Subsequently, the main processor 1 controls the modem 12 for reception of image data. With this control, the modem 12 generates a control signal representing the available transmission format and enters a standby state for receiving a facsimile signal. The control signal is generated in the DTMF form from the modem 12 and output to the communication network C via the matching circuit 18 and the circuit selection switch 11. When the communication partner starts transmitting the facsimile signal in response to the control signal, the modem 12 converts the facsimile signal received via the communication network C into the reception image data and supplies the image data to the main processor 1. The main processor 1 stores the received image data in the image memory 4 and controls the printing unit 7 to print this received image data. The printing unit 7 performs printing by the electrophotographic process of forming an electrostatic latent image on a photo-sensitive drum 7A with a laser beam applied according to the received image data, developing the electrostatic latent image into a toner image with toner TN deposited from the toner pack 7B onto the photosensitive drum 7A and selectively adhered to the electrostatic latent image as a developing agent, and transferring the toner image onto plain paper.

In a case where the manual communication mode is set by a mode setting command input from the key-operation unit 9, the circuit selection switch 11 is controlled by the main processor 1 to connect the telephone circuit 14 to the communication network C. In this mode, when the operator picks up the handset 1 prior to transmission of image data and inputs the FAX number data of the communication partner by means of the key-operation unit 9, the main processor 1 supplies the FAX number data of the communication partner to the telephone circuit 14. The telephone circuit 14 generates a dial-call signal corresponding to the FAX number data. This dial-call signal is output to the communication network C via the circuit selection switch 11. When the communication partner responds to the dial-call signal, the telephone circuit 14 enables voice communication with a use of the handset 15. The operator notifies facsimile transmission by speaking to the operator on the partner side. Thereafter, the handset 15 is returned to its original position. When return of the handset 15 is informed from the telephone circuit 14 to the main processor 1, the main processor 1 checks the document sensor 6 in the same manner as the automatic transmission and allows the scanner unit 5 to read the image of the original document as the transmission image data, performs a redundant compression coding on the transmission image data along with tone and shading correction. Subsequently, the main processor 1 controls the circuit selection switch 11 and the modem 12 for transmission of the image data. With this control, the circuit selection switch 11 connects the facsimile circuit FC to the communication network C, and the modem 12 generates a control signal for inquiring into the available transmission format. Thereafter, in-the same manner as the case of the above automatic transmission, the image data is transmitted as a facsimile signal.

On the other hand, when a dial-call signal arrives from the communication network C in a state that the telephone circuit 14 is connected to the communication network C, the call detection circuit 17 confirms the FAX number represented by the dial-call signal. After the main processor 1 is informed of the FAX number, the main processor 1 controls the telephone circuit 14 to drive the speaker 16, thereby notifying the dial call. When the operator picks up the handset 15 for the call, the telephone circuit 14 enables voice communication with a use of the handset 15. When facsimile transmission is verbally notified in this state, the operator inputs a start receiving command by means of the key-operation unit 9. Responding to the start receiving command, the main processor 1 awaits notification from the telephone circuit 14 that the handset 15 is returned to the original position, and then controls the circuit selection switch 11 and the modem 12 for reception of image data. With this control, the circuit selection switch 11 connects the facsimile circuit FC to the communication network C. Meanwhile, the modem 12 receives the facsimile signal after confirming the transmission format thereof, and converts the received facsimile signal into the image data. Thereafter, in the same manner as the case of the automatic reception, the received image data is stored in the image memory 4 and printed out with the printing unit 7.

Next, a maintenance process of the expendables will be explained. The main processor 1 performs the maintenance process each time the printing unit 7 is used. When the maintenance process begins, it is checked in step ST1 whether the cumulative total K of number of prints has reached a drum replacement number Kmax predetermined according to the service life of the photosensitive drum 7A. When K<Kmax is established, the number of sheets just printed is added to the accumulative number K in step ST2, and then step ST7 is executed.

When K≧Kmax is established in step ST1, the display unit 10 displays in step ST3 a request for a replacement photosensitive drum 7A for a preset period of time. Subsequently, it is checked in step ST4 whether a replacement completion notice of the photosensitive drum 7A has been input from the key-operation unit 9. When it is detected that the replacement completion notice has not been input, step ST7 is executed. On the other hand, when it is detected that the replacement completion notice has been input, the cumulative total K is cleared to "0" step ST5, the order process for the photosensitive drum 7A is performed in step ST6, and then ST7 is executed.

In step ST7, it is checked whether the near empty state of the toner pack 7B is detected by the toner sensor 8. When the toner pack 7B is not in the near empty state, the maintenance process is finished. On the other hand, when the toner pack 7B is in the near empty state, the display unit 10 displays a request for a replacement toner pack 7B for a preset period of time. Subsequently, it is checked in step ST9 whether a replacement completion notice of the toner pack 7B has been input from the key-operation unit 9. When the replacement completion notice has not been input, the maintenance process is finished. When the replacement completion notice has been input, the order process for the toner pack 7B is performed in step ST10 and then the maintenance process is finished.

Figure 3:
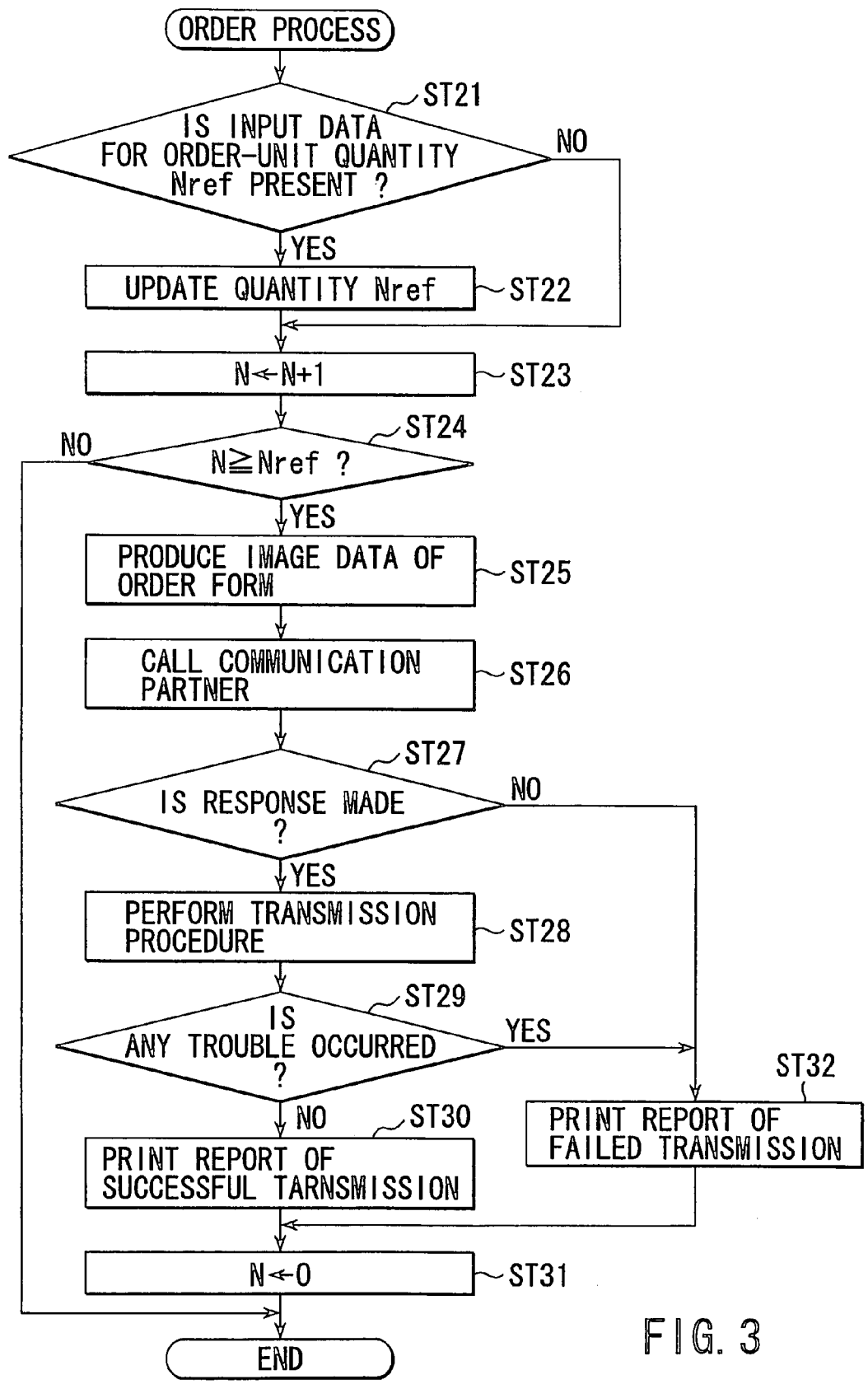
FIG. 3 is a detailed flowchart of an order process shown in FIG. 2.

FIG. 3 details the order process performed in each of steps ST6 and ST10 of the maintenance process. Here, the photosensitive drum 7A and the toner pack 7B are handled as expendable components. In FIG. 3, Nref denotes the order-unit quantity of expendable components, and N denotes the number of times maintenance of each expendable component, that is, replacement of the photosensitive drum 7A or the toner pack 7B is carried out. In practice, two kinds of order processes are performed regarding the expendable components, in which data for the order-unit quantity, the count of maintenance operations, and the expendable component number are different therebetween. Furthermore, the RAM 3 contains message data for an order form and an order transmission report preset in an initialization process of the facsimile device, and default data for the order-unit quantity Nref and the FAX number of the supplier input previously from the key-operation unit 9.

When the order process begins, it is checked in step ST21 whether data for the order-unit quantity Nref has been input from the key-operation unit 9. When the input data for the order-unit quantity Nref is present, the order-unit quantity Nref is updated by the input data in step ST22. When no input data for the order-unit quantity is present, the order-unit quantity Nref is maintained. Thereafter, the number N of maintenance is increased by "1" in step ST23, and it is checked in step ST24 whether the number N of maintenance has reached the order-unit quantity Nref. When N<Nref is established, the order process is finished.

When N≧Nref is established in step ST24, the main processor 1 produces in step ST25 image data of the order form in the image memory 4 as shown, for example, in FIG. 5. Further, the main processor 1 performs a redundant compression coding on the image data, and stores the information in the RAM 3. This order form includes items of order information such as a customer ID number, the name of the person in charge, contact telephone and FAX numbers, an order message, an expendable component number, an order-unit quantity and the like. Here, each item of order information may have specified data and a title added thereto. Subsequently, in step ST26, a communication partner such as the supplier of expendables is called on the basis of the FAX number data thereof. Under the control of the main processor 1, the circuit selection switch 11 connects the facsimile circuit FC to the communication network C, and the modem 12 generates a dial-call signal corresponding to the FAX number data of the supplier. Subsequently, it is checked in step ST27 whether a response is made from the supplier. When the response is made, the main processor 1 controls in step ST28 the modem 12 to perform a transmission procedure of a G3 standard transmission format, for example. That is, the modem 12 generates a control signal for inquiring the available transmission format to be output to the communication network C. Then, the modem 12 receives the control signal transmitted from the supplier as a response to the inquiry, and the DTMF detection circuit 13 demodulates this control signal, so that the main processor 1 can be informed of the available transmission format. The main processor 1 designates the G3 standard transmission format to the modem 12 in the case where this transmission format is available. The modem 12 demands the main processor 1 to supply the image data of the order form stored in the RAM 3. Upon supply of the image data, the modem 12 converts the information into a facsimile signal of the designated transmission format. This facsimile signal is output to the communication network C via the matching circuit 18 and the circuit selection switch 11. In step ST29, it is checked whether any trouble has occurred in transmission of the order form. When it is negative, in step ST30 the main processor 1 controls the printing unit 7 to print a report of successful transmission of an order shown in FIG. 5. This order transmission report contains the order form shown in FIG. 4 and a message 41 of "TRANSMISSION OF THIS ORDER WAS SUCCESSFUL" is included on the order form. Subsequently, in step ST31 the main processor 1 clears the number N of maintenance to "0" in preparation for determination of the next order timing, and then the order process is finished.

In the case where no response is detected in step ST27 or a problem is detected in step ST29, the main processor 1 controls, in step ST32, the printing unit 7 to print a report of failed transmission of an order shown in FIG. 6. This order transmission report contains the order form shown in FIG. 4 and a message 51 of "TRANSMISSION OF THIS ORDER FAILED" is included on the order form. Subsequently, the main processor 1 clears the number N of maintenance to "0" in step ST31, and then finishes the order process.

In the facsimile device according to this embodiment, the number N of maintenance for each expendable component is counted. An order form of the expendable component is transmitted to a facsimile device determined by the FAX number of the supplier each time the number N of maintenance is equivalent to the order-unit quantity Nref. That is, order information for ordering a quantity of expendable components is transmitted to the supplier when it is confirmed that maintenance of the expendable component is required, corresponding to the order-unit quantity. In a case where an initial stock of the expendable component exceeds the order quantity, a constant quantity of the expendable component remains as stock each time the order information is transmitted. Consequently, even when a time delay occurs in procuring the expendable component, the facsimile device would not be unusable due to lack of stock. Furthermore, this facsimile device does not require stock management for preventing the expendable component from being out of stock, so that the burden on the user can be reduced. Further, in a case where any of the stock is defective, the order-unit quantity Nref can be temporarily changed by data input from the key-operation unit 9.

Furthermore, since a report of successful transmission of an order is printed for the user, a situation can be avoided in which double-ordering of the expendable component occurs, by accident, due to the user not being aware of the fact that the order has been completed. Further, since this report contains the order form already transmitted, the user can confirm the content of the order form.

Furthermore, a report of failed transmission of an order is printed for the user in the situation where normal transmission cannot be carried out due to a malfunction of the facsimile device or the supplier's one being in use. Since this report contains the order form failed in transmission, the user can swiftly complete the ordering of the expendable component by the simple task of faxing the report.

Figure 2:
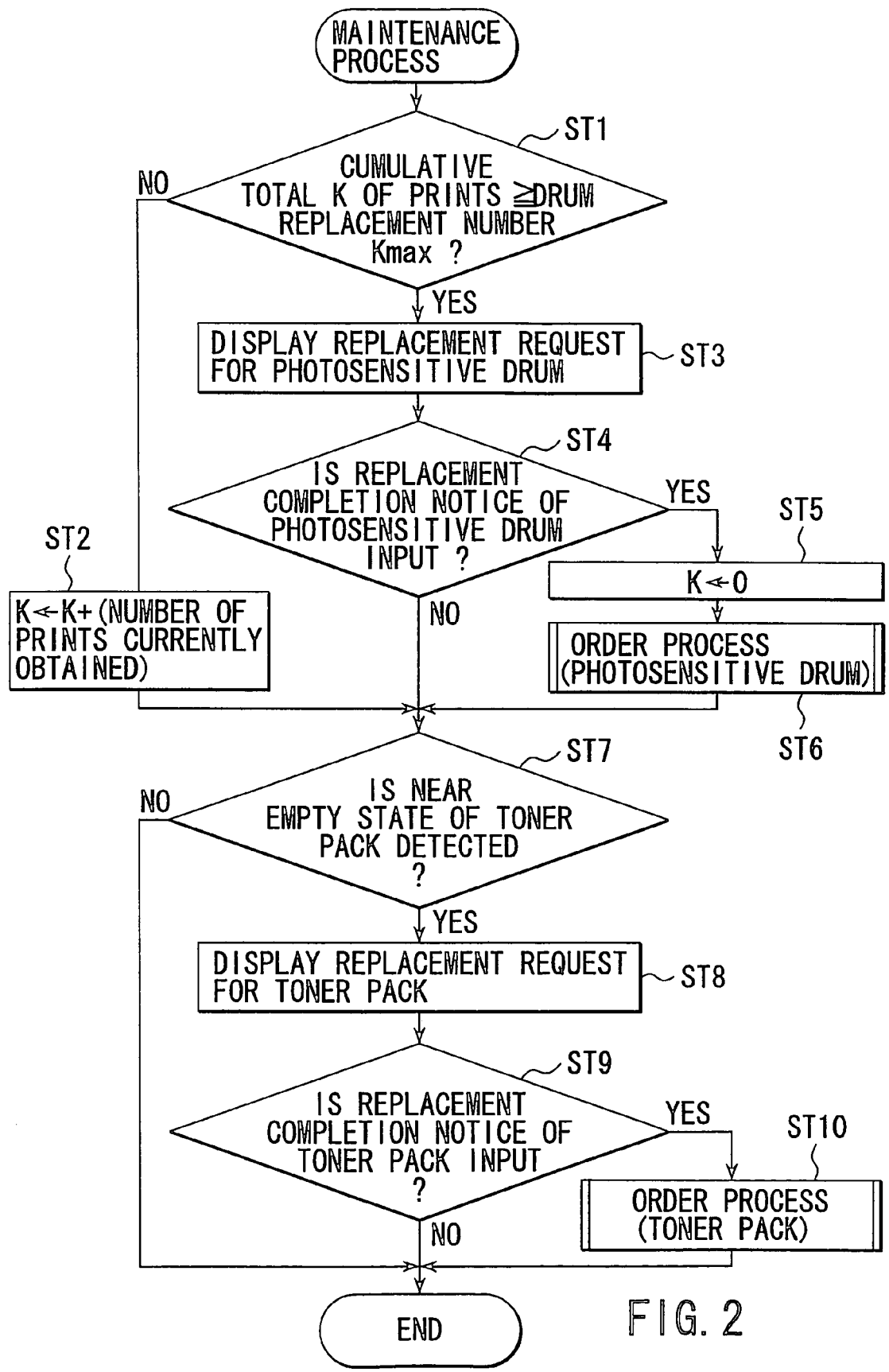
FIG. 2 is a flowchart of a maintenance process performed by a main processor shown in FIG. 1.

Furthermore, according to the embodiment, as shown in FIG. 2, a request for replacement of the expendable component is displayed in step ST3 or ST8, and it is checked in step ST4 or ST9 whether a replacement completion notice of the expendable component has been input from the key-operation unit 9. Since each of steps ST4 and ST9 serves as inhibiting means for inhibiting the order process shown in FIG. 3 from being performed without the replacement completion notice input from the key-operation unit 9, it is possible to prevent the automatic transmission of the order form by intentionally omitting the key-in operation of the replacement completion notice after replacement of the expendable component is actually carried out to comply with the displayed replacement request. That is, the stock of the expendable component can be decreased if the usage frequency of the facsimile device is lowered.

The present invention is not limited to the embodiment described above and can be modified as follows:

In the case where another expendable component is used in addition to the photosensitive drum 7A and the toner pack 7B, it may be confirmed that maintenance of the other expendable component is required a number of times corresponding to the order-unit quantity Nref in order to automatically transmit the order form of this expendable component. The number of times is determined to be equal to the order-unit quantity Nref in the embodiment described above. The number of times can be determined to a value (Nref-α) obtained by subtracting a minimum stock quantity a (e.g., α="1") from the order-unit quantity Nref in order to ensure that the expendable component remains in stock.

Furthermore, in this embodiment, replacement of the photosensitive drum 7A is required when the cumulative total K of prints has reached the drum replacement number Kmax, which represents a situation in which the service life of the photosensitive drum 7A is almost exhausted. Replacement of the toner pack 7B is required when the toner sensor 8 has detected a situation that the toner pack 7B is in the near empty state. The replacement timing of the expendable component such as the photosensitive drum 7A or the toner pack 7B can be defined as that of detecting another situation representing that maintenance of the expendable component is required. For example, the replacement timing of the photosensitive drum 7A may be a timing determined by the total period of power supply to the printing unit 7. Further, in the order process described above, the number N of maintenance is updated by counting the replacement completion notice input from the key-operation unit 9. Instead, the number N can be updated by counting a detection signal from a sensor for directly detecting replacement of the expendable component, or by counting termination of the replacement request obtained indirectly upon replacement of the expendable component.

Furthermore, in the above embodiment, the image data of the order form is transmitted in the form of a facsimile signal. Instead, the facsimile device may produce an e-mail having messages corresponding to the content of the order form or an e-mail having the image data of the order form enclosed as an attached file, and transmit the e-mail to the supplier via a computer network such as the internet or the like. That is, the order form may be produced in an arbitrary shape and transmitted in an arbitrary way.

Furthermore, the report of success or failure in sending the order need not be printed, but can be issued as an image displayed on the display unit 10, an alarm sound or voice message from the speaker 16, the lighting of a dedicated indicator and the like, or a combination thereof.

In the embodiment described above, the report of failed transmission includes, as shown in FIG. 6, the order form printed along with the transmission failure message 51. Instead, the order form shown in FIG. 4 may be printed independently of the report of failed transmission so as to carry out ordering of the expendable component by faxing the order form. Further, the order form shown in FIG. 4 can be printed instead of the report of failed transmission.

The present invention is applicable not only to the facsimile device of the embodiment described above, but also to an image processing apparatus, such as a copying machine, a printer or the like, that uses expendables requiring maintenance such as replacement or supplement by the user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   a printing unit for printing an image using an expendable component;
   a communication circuit connectable to a supplier of the expendable component via a communication network; and
   an order controller for controlling said communication circuit to transmit order information for ordering the expendable component to the supplier, when it is confirmed that a number of user-performed maintenance operations of the expendable component has reached an order-unit quantity, which is determined to keep a desired on-hand quantity of the expendable component and which does not change except when updating is required.

2. An image processing apparatus according to claim 1, wherein said order controller includes reporting means for issuing an order transmission report reflecting a result of transmission of the order information.

3. An image processing apparatus according to claim 1, wherein said order controller includes input means for inputting data for the order-unit quantity, and updating means for updating the order-unit quantity by the data input from said input means.

4. An image processing apparatus according to claim 1, wherein said order controller includes means for confirming that a maintenance operation of the expendable component has been completed.

5. A method for controlling an image processing apparatus which prints an image using an expendable component, said method comprising:
   counting a number of user-performed maintenance operations of the expendable component; and
   controlling a communication circuit which is connectable to a supplier of the expendable component via a communication network, to transmit order information for ordering the expendable component to the supplier, when it is confirmed that the counted number of user-performed maintenance operations has reached an order-unit quantity, which is determined to keep a desired on-hand quantity of the expendable component and which does not change except when updating is required.

6. An image processing apparatus comprising:
   a printing unit which prints an image using an expendable component;
   a communication circuit connectable to a supplier of the expendable component via a communication network; and
   an order controller which counts a number of user-performed maintenance operations of the expendable component, and which controls said communication circuit to transmit order information to order the expendable component to the supplier when it is confirmed that the counted number of user-performed maintenance operations has reached an order-unit quantity, which is determined to keep a desired on-hand quantity of the expendable component and which does not change except when updating is required.

7. An image processing apparatus according to claim 6, wherein said order controller includes an input unit to input data for the order-unit quantity, and an update device which updates the order-unit quantity by the data input from said input unit.

8. An image processing apparatus according to claim 6, wherein said order controller issues an order transmission report reflecting a result of transmission by the communication circuit.

9. An image processing apparatus according to claim 6, wherein said order controller includes an input unit to input a maintenance completion notice that a maintenance operation of the expendable component has been completed.

10. An image processing apparatus according to claim 6, wherein said order controller detects that a maintenance operation of the expendable component has been completed.

* * * * *